United States Patent
Hsiung et al.

(10) Patent No.: US 10,613,856 B2
(45) Date of Patent: *Apr. 7, 2020

(54) AUTOMATIC MACHINE-LEARNING HIGH VALUE GENERATOR

(71) Applicant: International Business Machines Corporation, Armonk, NY (US)

(72) Inventors: Wei-Hsiang Hsiung, Taipei (TW); Jeff H C Kuo, Taipei (TW); Chien Pang Lee, New Taipei (TW); John K C Lee, New Taipei (TW)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/685,852

(22) Filed: Aug. 24, 2017

(65) Prior Publication Data
US 2019/0065181 A1 Feb. 28, 2019

(51) Int. Cl.
| | |
|---|---|
| *G06F 8/10* | (2018.01) |
| *G06N 20/00* | (2019.01) |
| *G06F 11/36* | (2006.01) |
| *G06F 8/77* | (2018.01) |
| *G06F 8/76* | (2018.01) |
| *G06F 8/60* | (2018.01) |
| *G06F 8/75* | (2018.01) |

(52) U.S. Cl.
CPC .......... *G06F 8/77* (2013.01); *G06F 8/10* (2013.01); *G06F 8/76* (2013.01); *G06F 11/3684* (2013.01); *G06N 20/00* (2019.01); *G06F 8/60* (2013.01); *G06F 8/75* (2013.01)

(58) Field of Classification Search
CPC ..... G06F 8/10; G06F 8/60; G06F 8/75; G06F 8/76; G06F 8/70; G06N 99/005; G06N 20/00
See application file for complete search history.

(56) References Cited

U.S. PATENT DOCUMENTS

| | | |
|---|---|---|
| 6,002,869 A | 12/1999 | Hinckley |
| 7,165,074 B2 | 1/2007 | Avvari et al. |
| 7,178,063 B1 | 2/2007 | Smith |
| (Continued) | | |

OTHER PUBLICATIONS

List of IBM Patents or Patent Applications Treated as Related; (Appendix P), Filed Nov. 17, 2017, 2 pages.

(Continued)

*Primary Examiner* — Ziaul A Chowdhury
(74) *Attorney, Agent, or Firm* — Cantor Colburn LLP; Jeffrey S LaBaw

(57) ABSTRACT

A processor-implemented method for generating a test suite within a time requirement is provided. The processor-implemented method includes executing a rule selection operation to determine candidate test cases utilizing attributes corresponding to each of the candidate test cases to produce selected test cases. The processor-implemented method includes determining whether an estimated testing execution time of the selected test cases is equal to or less than the time requirement. The processor-implemented method includes generating the test suite based on the selected test cases when the estimated testing execution time is equal to or less than the time requirement.

5 Claims, 4 Drawing Sheets

(56) References Cited

U.S. PATENT DOCUMENTS

| | | | |
|---|---|---|---|
| 7,299,382 B2 | 11/2007 | Jorapur | |
| 7,581,212 B2 | 8/2009 | West et al. | |
| 7,873,944 B2 | 1/2011 | Bangel et al. | |
| 8,479,164 B2* | 7/2013 | Becker | G06Q 10/06 |
| | | | 717/124 |
| 8,706,656 B1* | 4/2014 | Lin | G06N 20/00 |
| | | | 706/12 |
| 9,032,369 B2 | 5/2015 | Balakrishnan et al. | |
| 9,311,598 B1* | 4/2016 | Bansal | G06N 5/00 |
| 9,501,389 B1* | 11/2016 | Bhuiya | G06F 11/3692 |
| 9,582,408 B1* | 2/2017 | Jayaraman | G06F 11/3688 |
| 9,811,074 B1* | 11/2017 | Aichele | G05B 19/4069 |
| 9,898,391 B1* | 2/2018 | Morice | G06F 11/3668 |
| 2003/0192029 A1* | 10/2003 | Hughes | G06F 8/20 |
| | | | 717/101 |
| 2007/0006037 A1 | 1/2007 | Sargusingh et al. | |
| 2008/0082968 A1 | 4/2008 | Chang et al. | |
| 2008/0263526 A1* | 10/2008 | Urra | G06F 11/3684 |
| | | | 717/136 |
| 2010/0162215 A1* | 6/2010 | Purcell | G06F 8/77 |
| | | | 717/127 |
| 2010/0293451 A1* | 11/2010 | Carus | G06N 20/00 |
| | | | 715/230 |
| 2012/0254660 A1* | 10/2012 | He | G06F 11/3688 |
| | | | 714/28 |
| 2013/0041613 A1* | 2/2013 | Bhide | G06F 11/263 |
| | | | 702/123 |
| 2013/0097659 A1* | 4/2013 | Das | G06F 21/629 |
| | | | 726/1 |
| 2014/0089889 A1* | 3/2014 | Maclay | G06F 9/4887 |
| | | | 717/104 |
| 2014/0351793 A1 | 11/2014 | Bartley et al. | |
| 2015/0067648 A1* | 3/2015 | Sivanesan | G06F 11/3684 |
| | | | 717/124 |
| 2015/0106384 A1* | 4/2015 | Go | G06F 8/77 |
| | | | 707/748 |
| 2015/0254171 A1 | 9/2015 | Harden et al. | |
| 2015/0378873 A1 | 12/2015 | Prasad | |
| 2016/0162392 A1 | 6/2016 | Hu et al. | |
| 2016/0378954 A1* | 12/2016 | Kitagawa | G06Q 50/22 |
| | | | 435/287.2 |
| 2017/0161243 A1* | 6/2017 | Manoraj | G06F 17/2288 |
| 2017/0220396 A1* | 8/2017 | Xuan | G06F 8/75 |
| 2018/0069967 A1* | 3/2018 | Mandry | H04N 1/00031 |
| 2018/0210709 A1* | 7/2018 | Bharthulwar | G06F 8/24 |
| 2019/0065182 A1 | 2/2019 | Hsiung et al. | |
| 2019/0205128 A1* | 7/2019 | van Schaik | G06F 8/77 |

OTHER PUBLICATIONS

Wei-Hsiang Hsiung et al., "Automatic Machine-Learning High Value Generator", U.S. Appl. No. 15/816,100, filed Nov. 17, 2017.
Emelie Enström, et al.; Improving Regression Testing Transparency and Efficiency With History-Based Prioritization—An Industrial Case Study; Lund University, IEEE, Jan. 1, 2011; pp. 367-376.

* cited by examiner

AUTOMATIC MACHINE-LEARNING HIGH VALUE GENERATOR

BACKGROUND

The present invention relates to an automatic machine-learning high value generator, and more specifically, to an automatic machine-learning system that produces selections and combination of high value tests based on execution history and source change sets.

With the growth of software product development processes, testing of corresponding software products and related processes has also increased in sophistication such that the quantity of tests for each stage of the product development process has increased. The increase in test quantity causes the time to execute the tests and receive results to become unbearable for developers. In turn, these tests are not executed, which jeopardizes the quality of products, or the execution of these test detrimentally affects the agility and productivity of the software product development processes.

SUMMARY

Embodiments of the present invention are directed to a processor-implemented method for generating a test suite within a time requirement. The processor-implemented method includes executing, by a processor, a rule selection operation to determine one or more candidate test cases utilizing attributes corresponding to each of the one or more candidate test cases to produce one or more selected test cases; determining, by the processor, whether an estimated testing execution time of the one or more selected test cases is equal to or less than the time requirement; and generating, by the processor, the test suite based on the one or more selected test cases when the estimated testing execution time is equal to or less than the time requirement.

Embodiments of the present invention can also include the above processor-implemented method implemented as a system and/or computer program product.

Additional features and advantages are realized through the techniques of the present disclosure. Other embodiments and aspects of the disclosure are described in detail herein. For a better understanding of the disclosure with the advantages and the features, refer to the description and to the drawings.

DETAILED DESCRIPTION

In view of the above, embodiments disclosed herein may include a machine-learning system, a machine-learning method, and/or a machine-learning computer program product (herein system) that generate test suites for software products and related processes with respect to time requirements.

Figure 1:
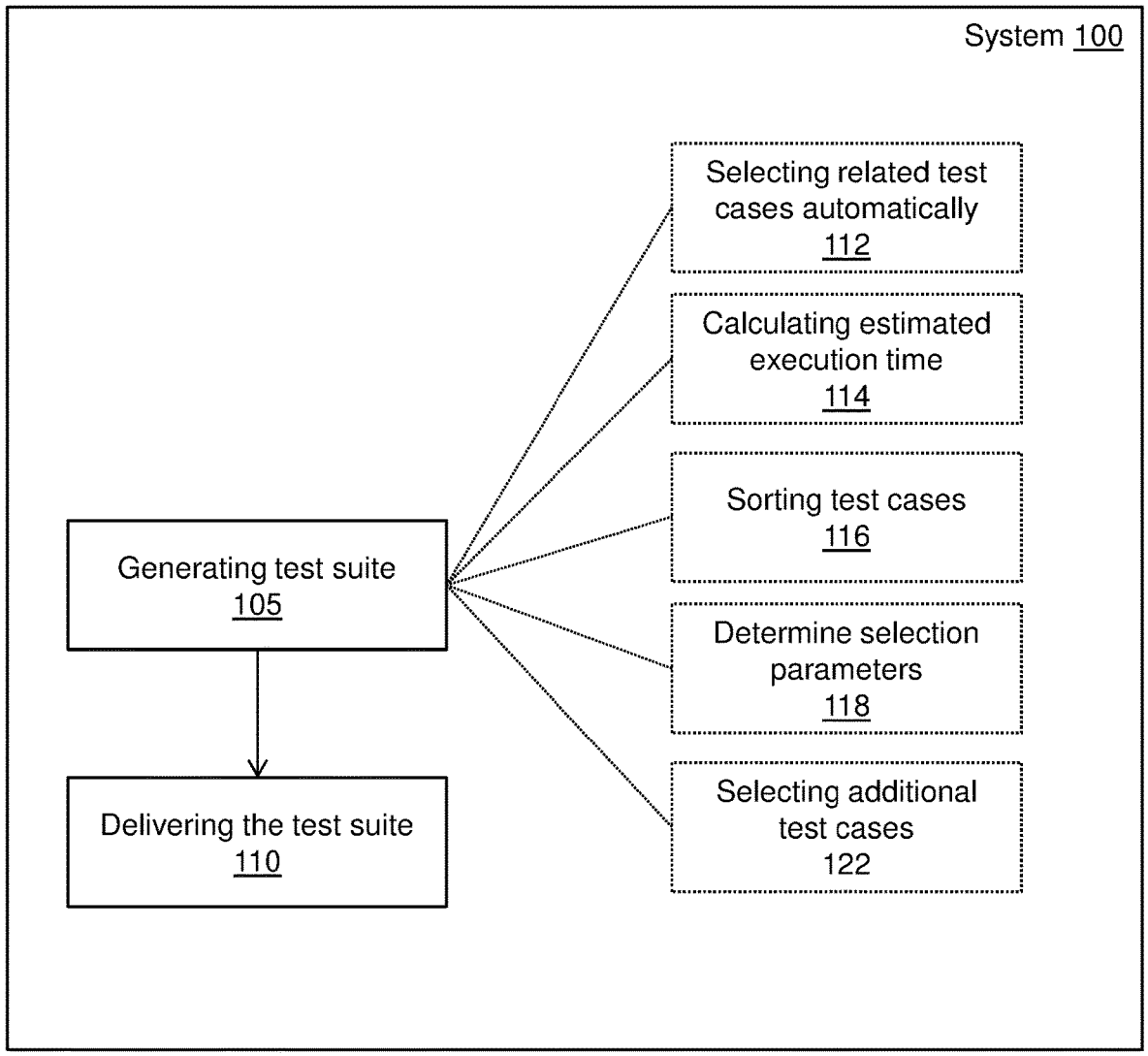
FIG. 1 depicts a system in accordance with one or more embodiments.

Turning now to FIG. 1, a system 100 is generally shown in accordance with an embodiment. The system 100 can be an electronic, computer framework comprising and/or employing any number and combination of computing devices and networks utilizing various communication technologies, as described herein with respect to FIG. 4. The system 100 can be easily scalable, extensible, and modular, with the ability to change to different services or reconfigure some features independently of others. The system 100 automatically generates the test suites, as shown at block 105. The system 100 also automatically delivers the test suites, as shown at block 110.

Test suites can comprise one or more pre-existing test cases and/or one or more customized test cases that test software products and related processes. The system 100 can generate the test suites from data pools and/or test pools containing these test cases, whether the pools are pre-existing and generated for the system 100, by associating each test case at least one attribute. The attributes can include but are not limited to, weight, execution time, pass/fail history, categories, features, descriptions, authors, modify time, defects, customer-reported bugs, etc.

For example, as shown in FIG. 1, the automatic generation of the test suites at block 105 can include one or more operations with respect to an automatic machine-learning by the system 100 to produce selections and combination of high value tests based on execution history and source change sets. The one or more operations can include but are not limited to, the operations depicted by blocks 112, 114, 116, 118, and 122.

At block 112, the system 100 can select related test cases automatically. The system 100 can select these test cases from data pools and/or test pools, whether the pools are pre-existing (e.g., stored in a database) and generated for the system 100 (e.g., customized by a user/developer). The test cases can be selected in accordance with the corresponding attributes as defined herein. For instance, based on the history of testing execution, machine-learning can select related test cases (some of which may have failed in past execution) based on a current change set. For example, in the past, a change set on files F1 and F2 broke the test cases T1 and T3. Then, if a current change contains files F1 and F2, then the test cases T1 and T3 can be learned and selected by the system 100. Test cases that are selected can be compiled into a test suite.

At block 114, the system 100 calculates an estimated execution time for any test suite. In an embodiment, the execution time for each selected test case can be accumulated to calculate the estimated execution time. If the estimated execution time is equal to or less than the desired execution time (e.g., a time requirement that can be preset by a user/developer), then the test suite can be used for testing the software product or related processes.

At block 116, the system 100 can sort the test cases of any test suite at any phase of the generation process. In turn, the selected test cases can be executed in the desired order. The test cases can be sorted in accordance with the corresponding attributes as defined herein.

At block 118, the system 100 can determine selection parameters for selecting/deselecting any related test cases and/or additional test cases automatically. The selection parameters can also be adjusted in accordance with the desired number of test cases to select. For instance, senior developers can have higher confidence/support values than junior developers, who have lower confidence/support values (senior developers is hardly to make mistakes or bugs while junior developers with less experience is prone to create bugs according to experience). The system 100, by adjusting the selection parameters (confidence/support) can increase/decrease a number of test cases created by the pool of both senior and junior developers. That is, increasing the selection parameter can result in a decrease in the number of test cases (as junior developers are eliminated from the pool), while decreasing the selection parameter can result in an increase the number of test cases (as junior developers are included).

In accordance with one or more embodiments, the selection parameters can include support and confidence parameters that indicate the reputation of the submitter (e.g., a user/developer), such that test cases having a higher value regarding the confidence parameter can trump test cases with a lower value. Support parameters can be defined as the minimum records to be able to select the test case. Confidence parameters can be defined as the minimum probability to select the test case. Consider the system 100 comprises history data as below, where 'F' designates a source code file, 'T' designates a test case, and H designates a history data entry:

H1-F1 F2→T1 (e.g., modification/creation of F1, F2 cause T1 to fail)
H2-F2 F3→T1 T3 (e.g., modification/creation of F2, F3 cause T1, T3 to fail)
H3-F3→T2 T #
H4-F3→T2
H5-F1→T3

From the above history data, the following associations are generated:

If F1 is modified/created, T3 is going to fail (support=1 (H5); confidence=1 (1/1))→(F1, T3)
If F3 is modified/created, T3 is going to fail (support=2 (H2, H3); confidence=2/3)→(F3, T3)
. . .
Etc.

In turn, if the system 100 adjusts a support parameter to a value of 2, then (F3, T3) will be selected and (F1, T3) will be dropped. Further, if the system 100 adjusts a confidence parameter to be 1, then (F3, T3) will be dropped and (F1, T3) will be selected.

At block 122, the system 100 can select additional test cases. The system 100 can select these additional test cases from data pools and/or test pools, whether the pools are pre-existing (e.g., stored in a database) and generated for the system 100 (e.g., customized by a user/developer). The test cases can be selected in accordance with the corresponding attributes as defined herein and/or with respect to a difference between an estimated execution time and the desired execution time. The additional test cases that are selected can be compiled into an existing test suite.

Thus, based on the at least one attribute, the one or more pre-existing test cases and/or the one or more customized test cases can be selected and compiled by the system 100 to execute within time requirements. In this way, the system 100 provides a time-sensitive mechanism for testing the software products and related processes under multiple circumstances.

The test suites can be configured by the system 100 to regress features/categories of the one or more pre-existing test cases and/or one or more customized test cases that comprise weak coverage. The test suites can also be configured by the system 100 to target critical areas of the software product and related processes that code changes may affect. For instance, but for new code changes, the system 100 can utilize a comment/label/functionality of a file that can be recognized or know by machine-learning. For example, if an added file F999 has not been encountered before by the system 100, the system 100 can determine that the added file F999 is related to a component (based on the comment and label) and performs a functionality to select via machine-learning test cases.

Technical effects and benefits of the system 100 and the resulting test suites comprise completing test executions within expected length of time, covering critical areas that new code changes could impact, focusing on risky features that have higher failing history (e.g., in view of the weights), yielding execution results of interests early, and evolving/adjusting (e.g., dynamic) machine-learning training after each execution cycle (e.g., Each iteration of testing execution can be an input of a next iteration in training from machine-learning, so if some test cases are stabilized and hardly fail any more, then the machine-learning will not select those test cases for a next iteration testing and vice versa). Thus, embodiments described herein are necessarily rooted in the system 100 to perform proactive operations to overcome problems specifically arising in the realm of software product and process testing.

Note the automatic generation of the test suites, at block 105, can include training processes and delivery testing.

Figure 2:
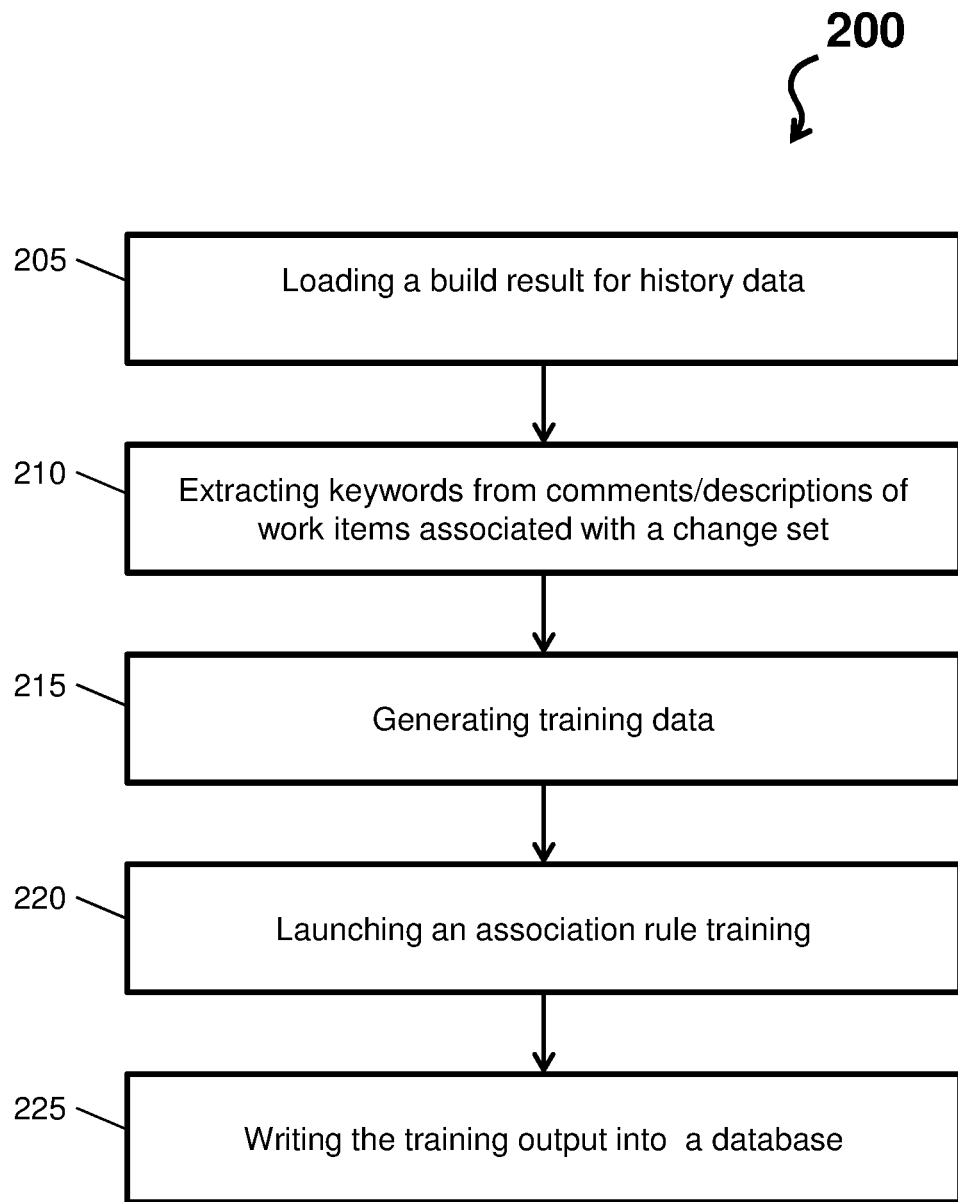
FIG. 2 depicts a process flow of system in accordance with one or more embodiments.

Turning now to FIG. 2, the system 100 can execute the training processes (once triggered) in view of a process flow 200 in accordance with one or more embodiments. That is, the process flow 200 is an example of automatic machine-learning by the system 100 to produce selections and combination of high value tests based on execution history and source change sets (e.g., to analyze history data/results). At block 205 of the process flow 200, the system 100 loads build results from history data. The history data can include change sets and failed test cases.

At block 210, the system 100 extracts keywords from comments/descriptions of work items associated with the change sets. During the extract of the keyword, stop words can be removed, and customized work lists can be provided to extract the desired result. For example, the system 100 can dynamically apply a rule selection priority algorithm to perform the background association rules learning (the automatic machine-learning by the system 100), e.g., if a key word for a certain function name of a test case is encountered by a learnt association rule, the system can dynamically determine a priority of running the test case. Note that a higher weighting has a higher priority and a sorting order can have the system trim a test case list to fit desired running time. Note also that the test cases selection is based on the parameters "confidence" and "support". The system 100 can also utilize weighting to adjust the values of the selection parameters according to a reputation of submitter (e.g. a developer who may cause less bugs can have higher weighting to have higher "confidence" and "support"—so it is acceptable for the system 100 to execute less test cases and shorten the execution time).

At block 215, the system 100 generates training data. The training data can be utilized by the system 100 to machine-learn test suites (without being explicitly programmed), such that the system 100 can adapt when exposed to new data. The training data is outputted as a text file. Each line of the text file represents each build result. An example of a format of this text file, in accordance with one or more embodiments, includes the form of "Label-1 Label-2 . . . Label-n-<Tab>FT-1 FT-2 . . . FT-n," where 'Label' is the name of the source file, keywords, or work item identification and 'FT' is the name of failed test case. Note that each 'Label' and each 'FT' is separated with a space. Also, note that the group of 'Labels' and the group of 'FTs' are separated by a 'Tab.'

At block 220, the system 100 launches an association rule training. The association rule training is a dynamic machine-learning operation by the system 100 that can utilize the training data of block 215. For example, the system 10 can record execution result to form the training data, where a first line of the result can appear as "ALPSD LMI F1 F3 F7 T1 T2 T11." This first line indicates that the change set contains file F1, F3, and F7, each of which is with "ALPSD" and "LMI" (ALPSD is the name of component in the system and LMI means the functionality). This first line further indicates that a change set broke the test cases T1, T2, and T11. Thus, in the future, if a delivered change set is related to ALPSD component, functionality LMI, and/or F1, F3, F7, then the test cases T1, T2, and T11 are candidate test cases for selection. The training result (e.g., the output of the association rule training) is a text file, which shows the relationship between labels and failed test cases. An example of a format of this text file, in accordance with one or more embodiments, includes the form of "Label-1, Label-2, . . . , Label-n→FT-1, FT-2, . . . , FT-n (support value, confidence value)."

At block 225, the system 100 writes the training output to a database. For example, the training result will be written into the database for a selection of test case during delivering code process.

Figure 3:
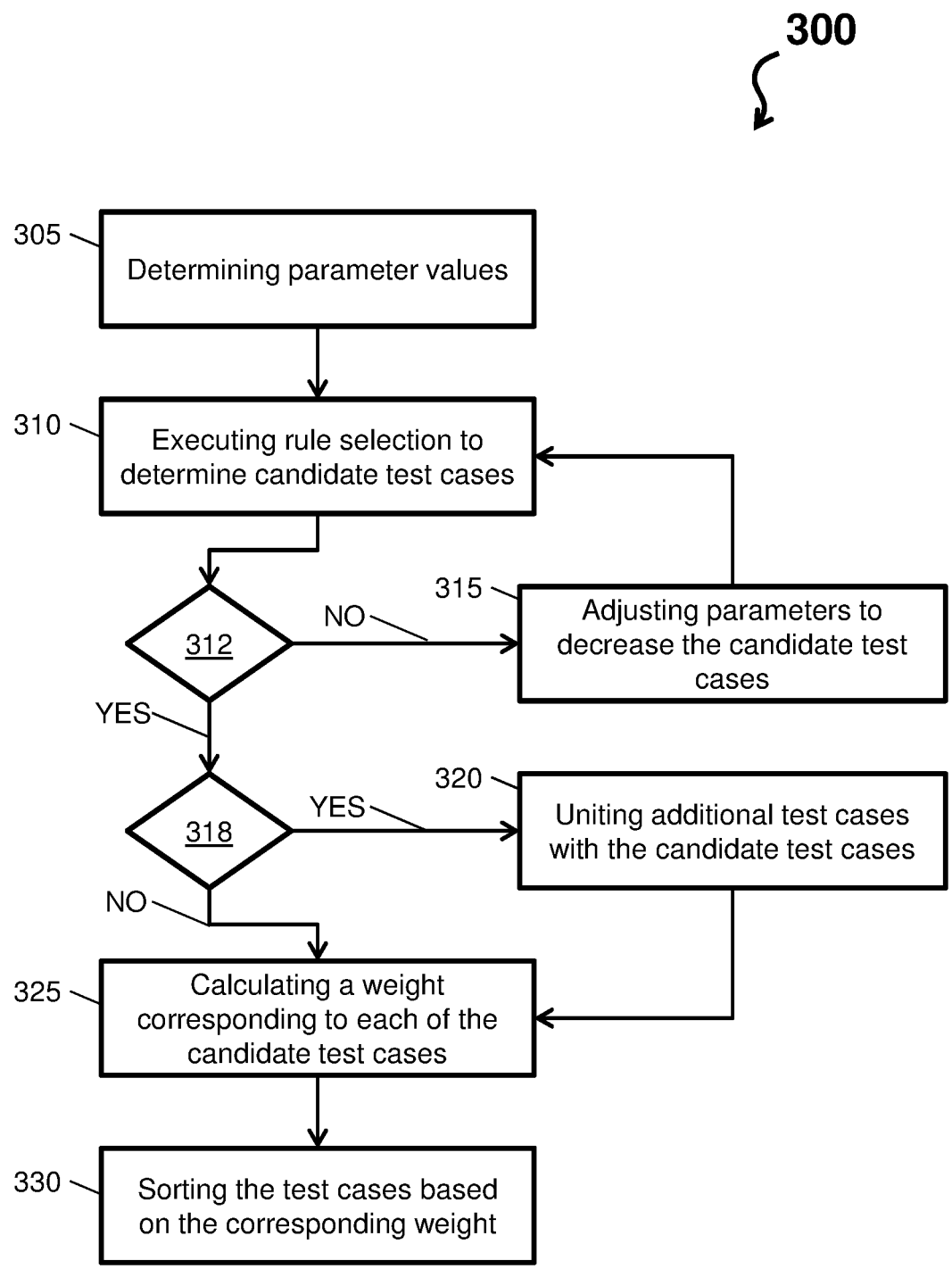
FIG. 3 depicts a process flow of system in accordance with one or more embodiments.

Turning now to FIG. 3, a process flow 300 of system 100 in accordance with one or more embodiments is depicted. In general, the process flow 300 selects test cases automatically before delivering change set based on given time length limit and reputation of submitter. The process flow 300 can begin when the system 100 triggers delivery testing. At block 305 of the process flow 300, the system 100 determines parameter values. The parameters for which values are determined can include support and confidence parameters. These values can be determined based on the reputation of the submitter (e.g., the user/developer can adjust a number of selected/recommended test cases by altering the confidence level). For instance, reputation can be quantified based on a developer's experience at a company, experience with the product, experience with the testing process, etc.

At block 310, the system 100 executes rule selection to determine candidate test cases. In accordance with one or more embodiments, the system 100 can execute a rule selection operation or algorithm that utilizes the attributes (or the test cases) to select candidate test cases. The rule selection operation can also utilize the parameters determined at block 305 to select the candidate test cases. In this way, the system 100 selects/recommends the test cases based on the machine-learning knowledge.

At decision block 312, the system 100 determines whether estimated testing execution times (of the selected candidate test cases) equal to or less than the desired execution time. If the estimated testing execution times greater than the desired execution time, then the process flow 300 proceeds to block 315 (see the NO arrow). At block 315, the system 100 adjusts parameters to decrease the candidate test cases, and the process flow 300 returns to block 315. Note that the process flow 300 can loop (repeat) through block 310, decision block 312, and block 315 if the system 100 the estimated testing execution times are greater than the desired execution time. Further, the loop through blocks 312, 315, and 310 is an example of a dynamic machine-learning implementation by the system 100, as the system 100 can react to and accommodate new data and parameters encountered during execution time determinations of block 312. If the estimated testing execution times are equal to or less than the desired execution time, then the process flow 300 proceeds to decision block 318 (see the YES arrow).

At decision block 318, the system 100 determines whether customized additional test cases are to be included in the delivery testing. If the customized additional test cases are to be included in the delivery testing, then the process flow 300 proceeds to block 320 (see the YES arrow). At block 320, the system 100 unites additional test cases with the candidate test cases, and the process flow 300 proceeds to block 325. If the customized additional test cases are not to be included in the delivery testing, then the process flow 300 proceeds to directly to block 325 (see the NO arrow).

At block 325, the system 100 calculates a weight corresponding to each of the candidate test cases. The weighting can be calculated based on a frequency of failure (e.g., a test case that fails more often has a higher weighting than a test case that fails less often). The weighting is calculated based on a latest failed time of test case (e.g., if a test case failed yesterday, it can have a higher weighting than a test case that failed last week). The weighting is calculated based on a confidence/support calculated by machine-learning of the system 100 given current change set (e.g., higher weighting can reflect a higher confidence and/or support that test case(s) will be easily broken by a change set. At block 330, the system 100 sorts the test cases based on the corresponding weight. At the conclusion of the process flow 300, the system 100 can being delivery testing based on the sorted test cases.

Figure 4:
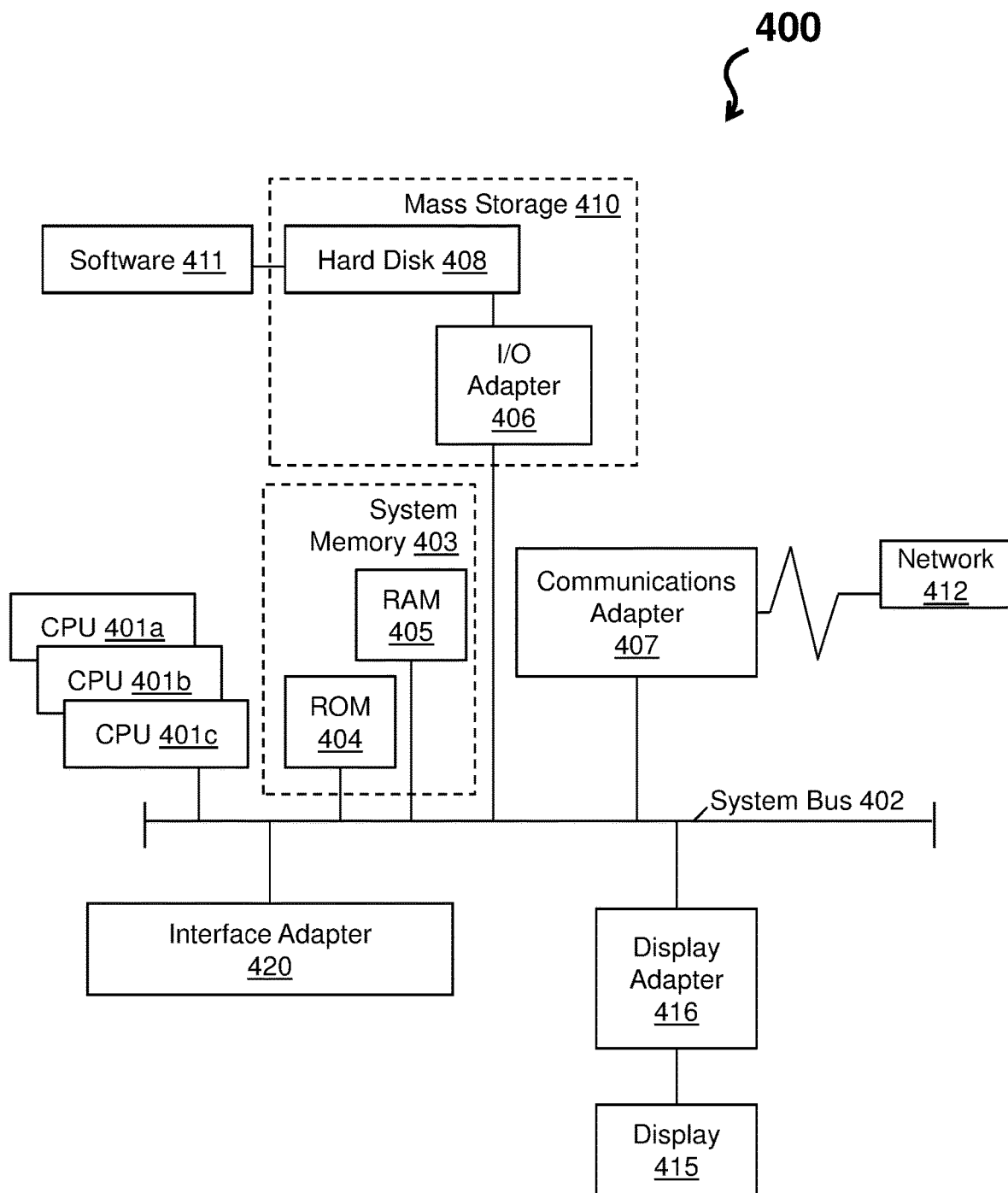
FIG. 4 depicts a processing system in accordance with one or more embodiments.

FIG. 4 depicts a system 400 (e.g., an example of the system 100) in accordance with one or more embodiments. The system 400 has one or more central processing units (CPU(s)) 401a, 401b, 401c, etc. (collectively or generically referred to as processor(s) 401). The processors 401, also referred to as processing circuits, are coupled via a system bus 402 to system memory 403 and various other components. The system memory 403 can include a read only memory (ROM) 404 and a random access memory (RAM) 405. The ROM 404 is coupled to the system bus 402 and may include a basic input/output system (BIOS), which controls certain basic functions of the system 400. The RAM is read-write memory coupled to the system bus 402 for use by the processors 401.

FIG. 4 further depicts an input/output (I/O) adapter 406 and a communications adapter 407 coupled to the system bus 402. The I/O adapter 406 may be a small computer system interface (SCSI) adapter that communicates with a hard disk 408 and/or any other similar component. The I/O adapter 406 and the hard disk 408 are collectively referred to herein as a mass storage 410. A software 411 for execution on the system 400 may be stored in the mass storage 410. The mass storage 410 is an example of a tangible storage medium readable by the processors 401, where the software 411 is stored as instructions for execution by the processors 401 to cause the system 400 to operate, such as is described herein with reference to FIGS. 2-3. Examples of computer program product and the execution of such instruction is discussed herein in more detail. Referring again to FIG. 4, a communications adapter 407 interconnects the system bus 402 with a network 412, which may be an outside network, enabling the system 400 to communicate with other such systems. A display (e.g., screen, a display monitor) 415 is connected to the system bus 402 by a display adapter 416, which may include a graphics controller to improve the performance of graphics intensive applications and a video controller. In one embodiment, the adapters 406, 407, and 416 may be connected to one or more I/O buses that are connected to the system bus 402 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to the system bus 402 via an interface adapter 420 and the display adapter 416. A keyboard, a mouse, a speaker, etc. can be interconnected to the system bus 402 via the interface adapter 420, which may include, for example, a Super I/O chip integrating multiple device adapters into a single integrated circuit.

Thus, as configured in FIG. 4, the system 400 includes processing capability in the form of the processors 401, and, storage capability including the system memory 403 and the mass storage 410, input means such as the keyboard and the mouse, and output capability including the speaker and the display 415. In one embodiment, a portion of the system memory 403 and the mass storage 410 collectively store an operating system, such as the z/OS or AIX operating system from IBM Corporation, to coordinate the functions of the various components shown in FIG. 4.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof The descriptions of the various embodiments herein have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising a processor and a memory storing program instructions for generating a test suite within a time requirement thereon, the program instructions executable by a processor to cause the system to:
   determine values of parameters based on a reputation, the parameters comprising support and confidence parameters, and the reputation comprising a quantification based on an experience of a developer at a company, with the product, and with the testing process;
   execute a rule selection operation to determine one or more candidate test cases utilizing the values of the parameters and utilizing attributes corresponding to each of the one or more candidate test cases to produce one or more selected test cases, wherein the rule selection operation comprises a dynamic automatic machine-learning that produces selections and combination of high value tests based on execution history;
   determine whether an estimated testing execution time of the one or more selected test cases is equal to or less than the time requirement;
   generate the test suite based on the one or more selected test cases when the estimated testing execution time is equal to or less than the time requirement; and
   calculate a weight corresponding to each test case of the test suite and sort the test suite based on the corresponding weight, the weight corresponding to each of the test case of the test suite being based on a frequency of failure and a confidence value based on the reputation of the developer.

2. The system of claim 1, the program instructions are further executable by the processor to cause the system to adjust the parameters to decrease the one or more selected test cases when the estimated testing execution time is greater than the time requirement.

3. The system of claim 1, the program instructions are further executable by the processor to cause the system to determine whether to include customized additional test cases in the test suite.

4. A computer program product for generating a test suite within a time requirement, the computer program product comprising a computer readable storage medium having program instructions embodied therewith, the program instructions executable by a processor to cause:
   determining values of parameters based on a reputation, the parameters comprising support and confidence parameters, and the reputation comprising a quantification based on an experience of a developer at a company, with the product, and with the testing process;
   executing a rule selection operation to determine one or more candidate test cases utilizing the values of the parameters and utilizing attributes corresponding to each of the one or more candidate test cases to produce one or more selected test cases, wherein the rule selection operation comprises a dynamic automatic machine-learning that produces selections and combination of high value tests based on execution history;
   determining whether an estimated testing execution time of the one or more selected test cases is equal to or less than the time requirement;
   generating the test suite based on the one or more selected test cases when the estimated testing execution time is equal to or less than the time requirement; and
   calculating a weight corresponding to each test case of the test suite and sort the test suite based on the corresponding weight, the, weight corresponding to each of the test case of the test suite being based on a frequency of failure and a confidence value based on the reputation of the developer.

5. The computer program product of claim 4, wherein the program instructions are further executable by the processor to cause adjusting the parameters to decrease the one or more selected test cases when the estimated testing execution time is greater than the time requirement.

* * * * *